Sept. 25, 1923.
H. B. RUDD
1,468,649
PROCESS FOR ELECTRICALLY TREATING LIQUIDS
Filed March 3, 1920
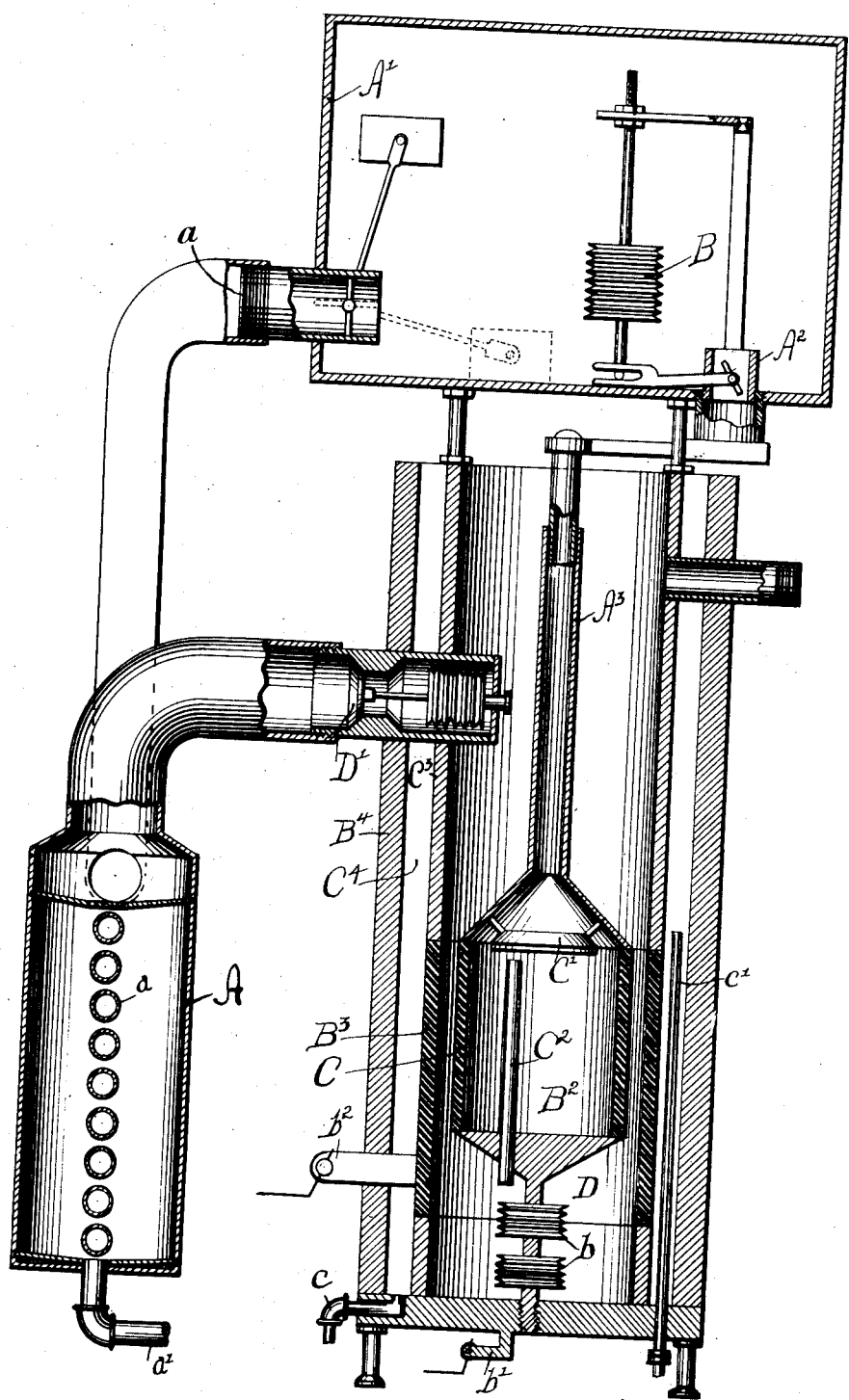
INVENTOR
Harry B. Rudd,
BY
ATTY.

Patented Sept. 25, 1923.

1,468,649

UNITED STATES PATENT OFFICE.

HARRY B. RUDD, OF MANSFIELD, OHIO.

PROCESS FOR ELECTRICALLY TREATING LIQUIDS.

Application filed March 3, 1920. Serial No. 362,927.

*To all whom it may concern:*

Be it known that I, HARRY B. RUDD, a citizen of the United States, residing at Mansfield, Richland County, Ohio, have invented certain new and useful Improvements in Processes for Electrically Treating Liquids, of which the following, taken in connection with the drawings, is a description.

My invention has for its object a process for electrically treating liquids of all kinds wherein any living bacteria therein may be destroyed or rendered inactive by the effect of successive shocks of rapidly alternating currents of electricity, whereby each molecule of the liquid being treated is affected instantaneously and simultaneously.

It is also an object of my invention to accomplish the above results when treating liquids having component parts of different specific gravity so that the liquid may be preserved in its natural state after being treated in the manner set forth in the following description of this process.

In the use of this process in connection with milk particularly, it is desirable to first preheat the milk before subjecting it to a high voltage current, as the gradual rise in temperature tends to increase the resistance of the desirable germs, whereby they are able to endure a higher temperature.

A more detailed description of the apparatus for carrying out this process is shown and described in my copending application, Serial No. 362,928.

A further object of my invention is to carry into effect a process of this kind wherein the entire treatment of the liquid is conducted in an enclosure, whereby it is subjected to the action of alternating currents of electricity of proper voltage and amperage to effect the desired result, and all of which treatment is conducted within an enclosure so that there is no opportunity for recontaminating the liquid in the further handling of it in bottling or sealing, etc. By this process I have found that liquid, particularly milk, will remain fresh and sweet for a very much longer period of time than untreated milk which is a very important factor where it has become necessary to ship it long distances for city consumption.

These and other advantages of my process will be apparent to those skilled in this art, and in the accompanying drawings I have illustrated one form of apparatus suitable for carrying out my process in a practical way, although of course, the process may be carried out with other forms of apparatus than that here shown.

The figure in the drawing illustrates a vertical, sectional view through the apparatus equipped with thermodynamic valves, whereby the process is rendered entirely automatic in its operation.

Inasmuch as I am at this time employing this process principally in the treatment of milk I will refer more particularly to that liquid, although I wish to be understood as contemplating the use of this process in the treatment of any other liquid.

In carrying out my process with an apparatus such as that disclosed in the drawings I provide a receptacle A, through which the fresh milk to be treated is passed through pipe $a$ to the receptacle A'. The fresh liquid to be treated is first warmed or preheated by the discharging treated milk flowing over and around the pipe $a$ on its way to discharge pipe $a^1$. By this means the heat units in the milk which has been treated are utilized to raise the temperature of the untreated milk before it enters the sterilizer. At the same time the lower temperature of the fresh milk flowing through pipe $a$ is cooling the treated milk flowing over said pipe $a$ to discharge through pipe $a^1$.

The milk to be treated passes from the receptacle A—by siphonic action into the receptacle A', where its passage to the sterilizer is regulated and controlled by a thermodynamic valve operated by the expansive member B. The liquid in the receptacle A flows through pipe $a$ into the receptacle $A^1$ through pipe $A^2$ to pipe $A^3$ into a cylinder $B^2$, the wall C of which is an electrode. As the milk to be treated enters this cylinder $B^2$, it is divided and caused to flow in a radial direction by means of the deflector C' which is suspended within the top of the cylinder, towards the inner wall of electrode C, down which it flows to the bottom of said cylinder, which gradually fills until it overflows through pipe $C^2$ into the chamber D.

$B^3$ is an electrode arranged concentrically with the electrode C which together with the casing $C^3$ forms a receptacle for the treated milk. This casing $C^3$ is positioned within an outer receptacle $B^4$ of larger diameter than the casing $C^3$ forming a chamber C⁴ therebetween which is adapted to be kept filled with cold water up to a point above the top of the electrode B³. Water for cooling the electrode enters through pipe *c* and overflows through pipe *c¹*.

When the liquid to be treated has filled the cylinder B², it overflows through the pipe C² into the chamber D which it gradually fills, surrounding the cylinder C, the liquid being treated passing through the narrow channel formed between the electrodes C, B³.

Each of the electrodes B³, C, has a suitable connection with a source of electrical energy, and as the liquid being treated is passed through the narrow channel formed between the two electrodes, high voltage alternating currents of electricity are passed through said liquid raising the temperature thereof to a point sufficient to destroy any oragnic life contained in the liquid. A temperature responsive mechanism in the form of a thermodynamic valve is provided at a convenient place in the wall of the receptacle B⁴, whereby when the liquid has reached a certain predetermined temperature, it will, through the action of the expansive mechanism of said valve, automatically open the valve D' and discharge said liquid into the receptacle A, where as previously explained it is passed over a pipe arranged therein in order to warm or preheat the fresh liquid being introduced through said pipe for treatment.

As will be observed, this process contemplates treating the liquid by passing alternating currents of electricity through it while it is flowing or passing between the electrodes B³, C, which are preferably, although not necessarily, arranged concentrically of each other as shown in the drawing. In this manner, the liquid while under treatment is passing in the form of a thin even film between the electrodes by means of which I am able to effect the same current pressure per square inch with a much lower voltage than has heretofore been possible, and also am able to secure the same results in the liquid being treated at a much lower temperature than has heretofore been the case.

This enables me to entirely overcome any possibility of burning or scorching the milk or other liquid under treatment. This latter effect, in the treatment of milk is most essential as it enables me to preserve the cream line which is required by dairies and boards of health in large cities.

The expense of treatment by this process is lessened so that the process becomes practical for commercial use; owing to the high voltage heretofore required for electrically treating liquids of this kind and the consequent loss of product by overheating has prevented the practical and commercial use of electricity for sterilizing liquids. By treating the liquid while it is in transit in the form of a very thin film, enables the electrical current to act upon each molecule of the liquid instantaneously and simultaneously whereby the operation becomes very effective in its results.

The active surface of the electrode C may be varied, without varying the quantity of liquid being treated, by the action of the expansive members $b$ which are positioned upon the upright support sustaining the cylindrical electrode C. As the temperature of the liquid rises the expansive member $b$ carries the cylindrical electrode upwardly within the casing thereof exposing a small surface area thereof to the current action through the electrode B³. $b'$—$b^2$ are terminals through which connection may be made to a suitable source of electrical energy.

I claim:

1. A process of electrically treating liquids consisting in gradually heating said liquid to a predetermined temperature, then causing it to pass between electrodes where it is subjected to a high voltage alternating current.

2. A process of electrically treating liquids consisting in gradually heating said liquid to a predetermined temperature, then causing it to move through a narrow elongated channel, dividing it into a thin sheet of liquid while subjecting it to a high voltage alternating current.

3. A process of electrically treating liquids consisting in preheating said liquid to a predetermined temperature and causing it to travel upwardly between electrodes while being subjected to a high voltage alternating current, and to discharge it when a predetermined temperature has been reached.

4. A process of electrically treating liquids consisting in introducing the liquid to be treated into a receptacle and causing it to pass in a thin sheet or film between electrodes while being subjected to high voltage currents of electricity.

5. A process of electrically treating liquids consisting in causing said liquid to flow upwardly through a narrow channel between concentrically arranged electrodes while passing currents of electricity through said liquid while in transit.

6. A process of electrically treating liquids consisting in gradually heating said liquid to a predetermined temperature then causing it to flow through a narrow channel between electrodes, passing currents of electricity through said liquid while in transit through said channel, and automatically discharging said liquid at a predetermined temperature.

7. A process of electrically treating liquids consisting in causing it to flow upwardly by siphonic action through a restricted channel formed between electrodes while passing alternating currents of high voltage through said liquid, automatically discharging it at a predetermined temperature, and then cooling said liquid.

8. A continuous process of electrically treating liquids consisting in preheating said liquid to a fixed temperature, then introducing it into a sterilizing chamber and causing it to pass upwardly between electrodes while subjecting it to alternating currents of electricity, and automatically discharging said liquid at a predetermined temperature.

9. A continuous process of electrically treating liquids consisting in preheating said liquid to a fixed temperature, then introducing it into a sterilizing chamber and causing it to pass upwardly in thin sheets between electrodes, while subjecting it to alternating currents of electricity, automatically discharging said liquid at a predetermined temperature, and utilizing the heat units in said treated liquid for preheating the fresh liquid in advance of its sterilization.

10. The herein described process of purifying liquids which consists of passing the liquid over a surface in a thin sheet and during its flow passing an electrical current through the thin sheet of the liquid.

In testimony whereof I have signed this specification.

HARRY B. RUDD.